(12) United States Patent
Zayat

(10) Patent No.: US 9,265,332 B2
(45) Date of Patent: Feb. 23, 2016

(54) HOLDER

(71) Applicant: KUL4U, Inc., Houston, TX (US)

(72) Inventor: Hassan N. Zayat, Houston, TX (US)

(73) Assignee: KUL4U, INC., Houston, TX (US)

( * ) Notice: Subject to any disclaimer, the term of this patent is extended or adjusted under 35 U.S.C. 154(b) by 88 days.

(21) Appl. No.: 14/084,577

(22) Filed: Nov. 19, 2013

(65) Prior Publication Data

US 2015/0136942 A1   May 21, 2015

(51) Int. Cl.
| | |
|---|---|
| A47G 29/00 | (2006.01) |
| F16M 11/00 | (2006.01) |
| A45F 5/00 | (2006.01) |
| A45F 5/02 | (2006.01) |
| A45C 13/00 | (2006.01) |
| A45C 13/02 | (2006.01) |

(52) U.S. Cl.
CPC ... *A45F 5/00* (2013.01); *A45F 5/02* (2013.01); *A45C 13/001* (2013.01); *A45C 13/02* (2013.01); *A45F 2200/0566* (2013.01)

(58) Field of Classification Search
CPC ..... A45F 5/00; A45F 2005/002; A63B 47/02; A47C 21/00; A47C 7/68; A47G 23/0225; A47G 23/0241
USPC ......... 52/682, 690; 248/311.2, 315, 497, 489, 248/104, 317, 318, 690, 691, 692, 693, 322
See application file for complete search history.

(56) References Cited

U.S. PATENT DOCUMENTS

| | | | |
|---|---|---|---|
| 237,140 A | | 2/1881 | Stone |
| 1,459,192 A | | 6/1923 | Bell |
| 1,574,223 A | | 2/1926 | Wilcox |
| 1,672,194 A | | 6/1928 | Becker |
| 2,123,466 A | | 7/1938 | Halsey |
| 2,229,403 A | * | 1/1941 | Benander ...................... 439/575 |
| 2,520,818 A | | 8/1950 | Terry |
| 2,558,768 A | * | 7/1951 | McCormick ............... 248/230.8 |
| 2,708,061 A | * | 5/1955 | Kotchka ......................... 224/248 |
| 2,802,687 A | * | 8/1957 | Du Chene .................... 294/19.2 |
| 2,965,108 A | | 12/1960 | Schlatterer |
| 3,568,969 A | * | 3/1971 | Boman et al. .............. 248/311.2 |
| 4,176,773 A | | 12/1979 | Wilkinson |
| D259,063 S | | 4/1981 | Manikas |
| 4,830,244 A | | 5/1989 | Brannon |
| 4,927,354 A | | 5/1990 | Sanford |
| 4,955,807 A | * | 9/1990 | Chance et al. ................ 431/296 |
| 5,060,995 A | * | 10/1991 | Goldstein et al. ............. 294/209 |
| 5,199,758 A | | 4/1993 | Howell |

(Continued)

FOREIGN PATENT DOCUMENTS

| | | |
|---|---|---|
| GB | 2372693 A | 9/2002 |
| WO | 9315620 A3 | 9/1993 |

(Continued)

OTHER PUBLICATIONS

Hassan N. Zayat, Holder, Design U.S. Appl. No. 29/473,743.

*Primary Examiner* — Mark Wendell
(74) *Attorney, Agent, or Firm* — Culotta Law Firm, PLLC

(57) ABSTRACT

A holder, in helix form, has an opening in communication with a helix interior. The helix may be capable conforming to the shape of an article to be carried at least partially within the interior. Applying a strain to the helix causes the helix to grip the article. The gripping by the helix may be reduced or eliminated by applying a compressive force to the helix.

16 Claims, 4 Drawing Sheets

(56) References Cited

U.S. PATENT DOCUMENTS

| | | | |
|---|---|---|---|
| 5,402,899 A * | 4/1995 | Ammeson | 215/391 |
| 5,511,754 A * | 4/1996 | Johannsen | 248/311.2 |
| D373,849 S | 9/1996 | Passalacqua | |
| 5,570,863 A | 11/1996 | Cooper | |
| 5,634,479 A * | 6/1997 | Jordan et al. | 132/275 |
| D380,293 S | 7/1997 | Cudmore | |
| 5,729,870 A | 3/1998 | Sharp | |
| 6,196,382 B1 | 3/2001 | Lenderman | |
| 6,325,073 B1 | 12/2001 | Di Maria Poole et al. | |
| 6,382,481 B1 | 5/2002 | McIlmoil | |
| D458,098 S | 6/2002 | Hastings | |
| D465,709 S | 11/2002 | Robinson | |
| D471,005 S | 3/2003 | Hastings | |
| 6,626,333 B2 | 9/2003 | Levesque et al. | |
| D537,199 S | 2/2007 | Poirier | |
| D539,527 S | 4/2007 | Hastings | |
| D539,528 S | 4/2007 | Hastings | |
| D617,495 S | 6/2010 | LoRe | |
| D632,908 S * | 2/2011 | Tincher | D6/513 |
| D649,709 S | 11/2011 | Loman | |
| 2003/0222189 A1 * | 12/2003 | Lee | 248/302 |
| 2006/0065684 A1 | 3/2006 | Houcek | |
| 2011/0079600 A1 * | 4/2011 | Pellereau | 220/661 |
| 2013/0134277 A1 * | 5/2013 | Gray | 248/318 |

FOREIGN PATENT DOCUMENTS

| | | |
|---|---|---|
| WO | 2009019679 A1 | 2/2009 |
| WO | 2011161440 A1 | 12/2011 |

* cited by examiner

©2013 KUL4U, Inc.

©2013 KUL4U, Inc.

©2013 KUL4U, Inc.

©2013 KUL4U, Inc.

©2013 KUL4U, Inc.

HOLDER

REFERENCE TO RELATED APPLICATIONS

Not applicable.

FEDERALLY SPONSORED RESEARCH

Not applicable.

FIELD OF INVENTION

The embodiments described herein relate to a holder having a helix form. The holder may be used to carry an article by faxing on a person or on an object. The holder may be used to free a person's hands for tasks other than carrying an article while allowing for both security of the article and ease of access to the article when carrying it.

BACKGROUND

Articles may be carried on a person, for example, in a pocket. Articles may be carried in an object, for example, a purse, briefcase or backpack. Articles carried on a person or in an object may include, for example, a lighter, a case for carrying smoking accessories a cigarette, an electronic cigarette, a cell phone, a tablet, a writing utensil, a bottle, a can, a tube, a case, a flashlight, a pocket knife, a wallet, a hair brush, or a hair dryer.

Carrying articles in a pocket frees a person's hands allowing the person to use the hands for other tasks. The article held in a pocket may be accessible. However, articles carried in pockets can slip out of the pocket and be lost. Additionally, it may be difficult to access articles in pockets when sitting.

An article may be carried more securely in a purse or bag. Although more secure, the article may also be less accessible when needed if held within an inner or outer pocket of the bag.

BRIEF SUMMARY

A holder, in helix form, has an opening that leads into a helix interior. The helix interior is capable of receiving at least a portion of an article to be carried. The helix may be capable of conforming, to the shape of an article to be carried at least partially within the helix interior.

The helix, has a long axis and is capable of changing dimension when a force is applied to at least a portion of the helix. The force may be a strain or a compression of at least a portion of the helix. The direction of the strain or compression is substantially in the direction of the long axis.

For example, the dimension of the helix interior may be reduced when a force is applied to the helix. For example, strain (such as a tensile force) may be applied in the direction of the long axis. The dimension of the helix interior may be enlarged when compression is applied to at least a portion of the helix in the direction of the long axis.

When the helix is adapted to conform to the shape of an article located at least partially within the helix interior, the helix may exert a gripping force on that article when a strain is applied to the helix. The gripping force may be reduced or eliminated by applying a compressive force to the helix.

BRIEF DESCRIPTION OF THE DRAWINGS

For the purpose of illustrating the invention, there is shown in the drawings one or more embodiments that are exemplary; it being understood, however, that this disclosure is not intended to be limited to the precise arrangements and instrumentalities shown.

The figures shown in this patent document contain material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

DETAILED DESCRIPTION

Figure 1:
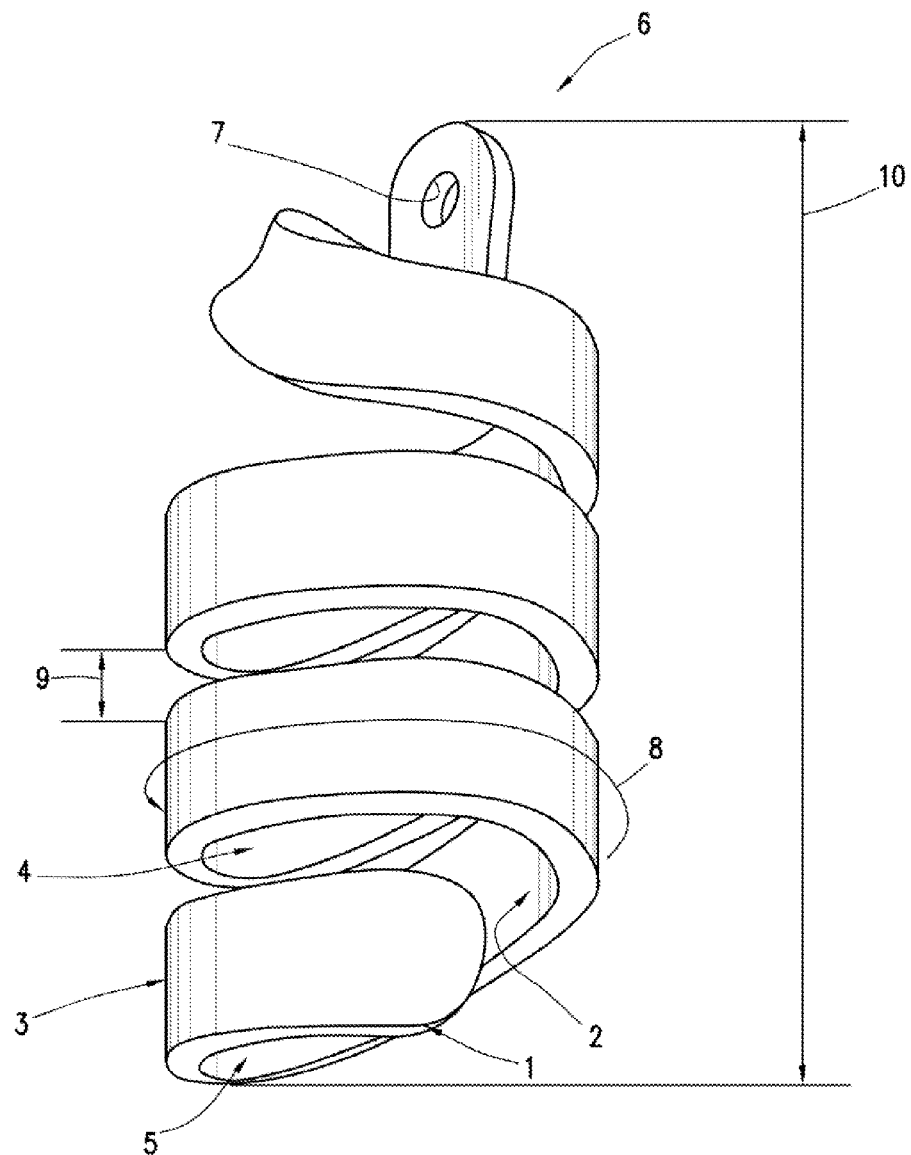
FIG. 1 is a side view of an embodiment of a holder.

An embodiment of the holder is depicted in FIG. 1. The embodiment has a helix form. The term helix is used herein to refer to a structure produced by a length of material wound to form an interior space The embodiment shown in FIG. 1 has a helix inside surface 2, a helix outside surface 3, a helix opening 5 leading into the helix interior 4, a first end 1, and a second end 6. The embodiment is comprised of at least one turn 8. Turns are separated by a space 9 or spaces, depending upon the location of the turn. The embodiment in FIG. 1 has a helix long axis direction shown as 10. The second end 6 is adapted with a hole 7 as the fixing element to aid in fixing the holder on a person or object.

Figure 2:
FIG. 2 is a side view of an embodiment with a strain applied to the helix in the direction of the long axis and resulting reduced dimension of the helix interior.

Referring now to FIG. 2, the helix may change dimension upon application of a strain to at least a portion of the helix in the direction of the long axis. FIG. 2 depicts application of a strain to the entire helix in the direction of the long axis. The dashed lines show an increase in the length of the helix and a decrease in the size of the helix interior space upon application of the strain. Strain may be measured in pounds per square inch (psi).

In various embodiments, the strain needed to cause a change in the length of the helix may be at least 0.1 psi. All individual values and subranges from equal to or greater than 0.1 psi are included herein and disclosed herein. For example, the amount of strain may be equal to or greater than 0.1 psi, or in the alternative, greater than or equal to 0.2 psi, or in the alternative, greater than or equal to 0.3 psi, or in the alternative, greater than or equal to 0.4 psi, or in the alternative, greater than or equal to 0.5 psi, or in the alternative, greater than or equal to 0.6 psi, or in the alternative, greater than or equal to 0.7 psi, or in the alternative, greater than or equal to 0.8 psi, or in the alternative, greater than or equal to 0.9 psi, or in the alternative, greater than or equal to 1.0 psi.

Figure 3:
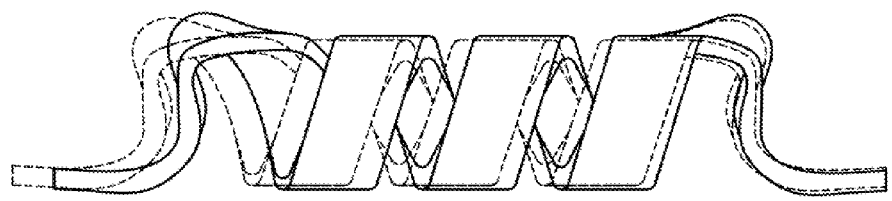
FIG. 3 is a side view of an embodiment with a compressive force applied to the helix in the direction of the long, axis of the helix and resulting enlarged dimension of the helix interior.

Referring now to FIG. 3, the helix may change dimension upon application of a compressive force to the helix. FIG. 3 depicts application of a compressive force to the entire helix in the direction of the long axis. The dashed lines show a decrease in the length of the helix and an increase in the size of the helix interior upon application of the compressive force. Compressive force may be expressed in psi. In various embodiments, the compressive force needed to cause a change in the length of the helix may be at least 0.1 pound per square inch. All individual values and subranges from equal to or greater than 0.1 psi are included herein and disclosed herein. For example, the amount of compressive force may be equal to or greater than 0.1 psi, or in the alternative, greater than or equal to 0.2 psi, or in the alternative, greater than or equal to 0.3 psi, or in the alternative, greater than or equal to 0.4 psi, or in the alternative, greater than or equal to 0.5 psi, or in the alternative, greater than or equal to 0.6 psi, or in the alternative, greater than or equal to 0.7 psi, or in the alternative, greater than or equal to 0.8 psi, or in the alternative, greater than or equal to 0.9 psi, or in the alternative, greater than or equal to 1.0 psi.

Figure 4:
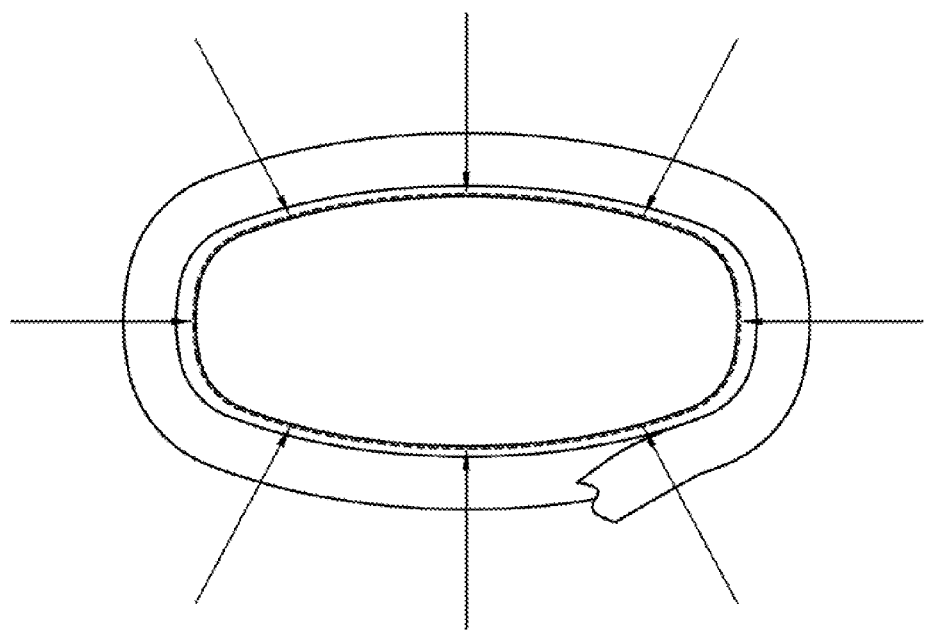
FIG. 4 is a bottom view of an embodiment with a strain applied to the helix and resulting reduced dimension of the helix interior.

FIG. 4 depicts a bottom view of an embodiment and helix interior 4. The dashed lines show a reduced size of the helix interior upon application of a strain to all, or a portion of, the helix. The arrows in FIG. 4 indicate the direction of a gripping, force generated when the strain to at least a portion of the helix in the direction of the long axis.

Figure 5:
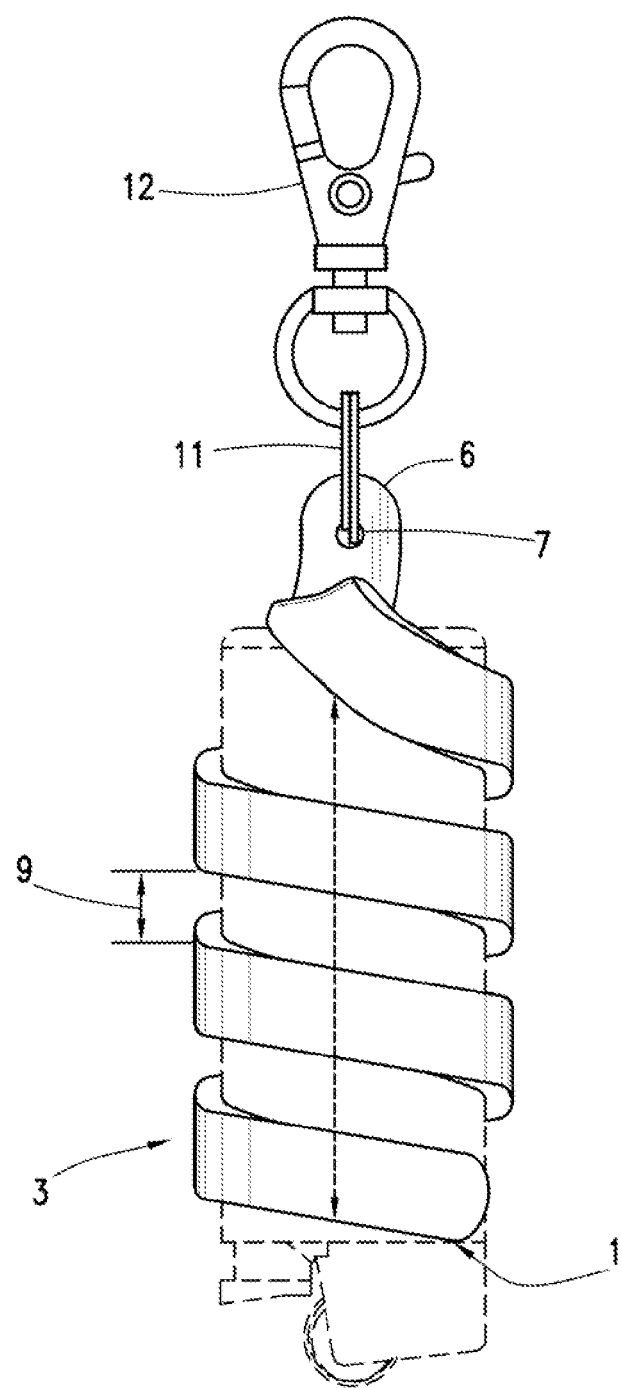
FIG. 5 is a side view of an embodiment for holding a lighter.

FIG. 5 depicts an embodiment of the holder holding an article. The article in the embodiment is a lighter shown in dashed lines. The lighter may be inserted through helix opening 5 (shown in FIG. 1). The lighter may be inserted into the helix through the helix opening 5 into helix interior 4. In some embodiments, the helix interior is capable of at least partially conforming to the shape of the article. In some embodiments, the article may fill substantially all or all of the helix interior 4.

The embodiment depicted in FIG. 5 has an end 6 adapted with a hole 7. Hole 7 may be used for fixing the holder to a person or object. A ring inserted through hole 7 attaches to fastener 12. Embodiments of the holder may be fixed to a person or object; meaning that some point along the holder is connected directly or indirectly to something or someone capable of opposing a strain to the helix.

Still referring to FIG. 5 when the holder is fixed to a person or object and oriented as shown in FIG. 5, the weight of the article may apply sufficient strain to extend the helix sufficiently to cause the helix to exert a gripping force on the article. The embodiment in FIG. 5 may be fixed to a person or object through fastener 12 connected to end 6 through hole 7 and ring 11. Fastener 12 may oppose the strain created by the weight of the article. The embodiment in FIG. 5, in such orientation, may exert a gripping force on the lighter further securing the lighter and providing easy access to the lighter.

As used herein, the term helix does not refer to any particular helix interior shape and can include the interior shape shown in FIG. 4. The embodiments in FIGS. 1-5 depict a helix that is formed from a strip. A helix formed from a strip will have a helix inner surface, a helix outer surface and edges as depicted in FIG. 1. The inner surface 2 is the surface that may be capable of either (or both of) (a) at least partially conforming to the shape of an article, and (b) at least partially circumscribing an article.

In some embodiments, the helix interior shape may be circular, rectangular, square, or pentagonal or any other shape suitable for carrying an article. In other embodiments, the helix surface may be rounded with a portion that faces the helix interior and portions that do not face the helix interior. The helix may have no edges but rather may be a continuous surface, a portion of which would face the helix interior. Other shapes may be contemplated without departing from the spirit of this disclosure.

The helix may be made of any material that can be shaped into a helix which may change dimension under strain or compressive force. In some embodiments, the helix is made of a material capable of conforming at least partially to an article to be carried at least partially in the helix interior. Embodiments may be made of one or more thermoplastic materials, elastomers, rubber, silicon polymers, plastic, and the like alone or in various combinations. In some embodiments, the helix is comprised more generally of thermoplastic materials. Some embodiments employ one or more alloys of polyvinyl chloride; ethene, chloro-homopolymer a an acrylic-containing polymer (including acrylic acid derivatives). In other embodiments, the thermoplastic material is comprised of polyvinyl chloride; ethene, chloro-homopolymer and chlorinated polyvinyl chloride. In a preferred embodiment, the helix is comprised of KYDEX brand pellets or sheet material, which is commercially available from Kydex, LLC (Bloomsburg, Pa.).

In some embodiments, at least a portion of the helix surface may exhibit tack, blocking point or coefficient of friction properties with respect to the material comprising the article to be carried. The amount of tack, blocking point or coefficient of friction (if any) desired may be balanced with how closely the helix is adapted to conform to the shape of an article to be carried and the amount of gripping force the helix is capable of exerting upon the article to be carried. The less closely the helix is adapted to conform to the shape of an article to be carried, or the lower the amount of gripping force the helix is capable of exerting on the article to be carried, the relatively higher either (or any of the) tack, blocking point or coefficient friction that may be desired.

For example, the helix inside surface depicted in FIG. 1 may be adapted to conform to an article to be carried so that the helix inside surface 2 is in substantial contact with the article to be carried without application of a strain to the helix. In some embodiments, at least as portion of the helix surface may be in substantial contact with the article to be carried. This may be achieved when the helix interior substantially conforms to the shape of the article. In some embodiments, there may be less or no such contact. For such latter embodiments, the helix interior surface may have relatively higher tack, blocking point or coefficient of friction properties with respect to the article to be carried.

Tack may be measured by ASTM D3121-06. The blocking point of the material comprising the helix with respect to the material comprising the article to be carried may be measured using ASTMD 1146-00. The static coefficient of friction and kinetic coefficient of friction between the material comprising the helix and the article to be carried may each be measured using ASTM D1894-11.

Blocking point may be defined as the adhesion between touching, materials under moderate pressure. See, for example, George Wypich in Handbook of Antiblocking, Release and Slip Additives Antislip and Release Properties (2005 Chem Tree Publishing). Blocking point may characterized as no blocking, first degree (one sample clings to the other without damage upon release), second degree blocking (cling with surface damage upon separation), third degree blocking, and any other type of blocking agreed upon as provided in ASTM D 1146-00.

In some embodiments described herein, the blocking point between the material comprising the helix and the article to be carried may be first degree blocking, following the exertion of some gripping force upon the article to be carried by the holder. In other embodiments, there may be no blocking point under comparable conditions.

In some embodiments, the static coefficient of friction of the material comprising the helix and the article with respect to the material comprising the article to be carried may be at least 0.1 (winless measure under the ASTM measurement procedure). In various embodiments, the static coefficient of friction may be at least 0.1. All individual values and subranges from equal to or greater than 0.1 are included herein and disclosed herein. For example, the static coefficient of friction may be equal to or greater than 0.10, or in the alternative, greater than or equal to 0.15, or in the alternative 0.20, or in the alternative, greater than or equal to 0.25, or in the alternative, greater than or equal to 0.30, or in the alternative, greater than or equal to 0.35, or in the alternative, greater than 0.40, or in the alternative greater than 0.45.

In some embodiments, the kinetic coefficient of friction of the material comprising the helix and the article with respect to the material comprising the article to be carried may be at least 0.10 (unitless measure under the ASTM measurement procedure). In various embodiments, the kinetic coefficient of friction may be at least 0.10. All individual values and subranges from equal to or greater than 0.10 are included herein and disclosed herein. For example, the kinetic coefficient of friction may be equal to or greater than 0.10, or in the alternative, greater than or equal to 0.15, or in the alternative equal to or greater than 0.20, or in the alternative, greater than or equal to 0.25, or in the alternative, greater than or equal to 0.30, or in the alternative, greater than or equal to 0.35, or in the alternative, greater than 0.40, or in the alternative greater than 0.45.

The strain force or forces and compressive force or forces in this disclosure may be applied to or on one end, from both ends, or from other locations on the helix. In some embodiments, one or more tabs positioned on the helix may facilitate the application of any of the compressive force.

The holder may be fixed to a person or an object. The fixing need not be directly to the person or object. For example, fixing to a person may be by fixing, to clothing worn by a person. Fixing, to an object may be by fixing to a purse, a brief case or the like as may be taken from place to place by a person.

The embodiment depicted in FIG. 1 has a hole 7 as a fixing element. In contrast, the embodiments depicted in FIGS. 2-3 do not depict a hole as fixing element. In some embodiments, the fixing element for fixing the holder to a person or an object may be a hole 7 through which any variety of fastener (for example, 12 in FIG. 5) may be added. Other fasteners include, for example, clips, clasps, spirals, rings, pins, safety pins, bands, loops, cords, leashes and strings.

In other embodiments, one or more ends of the helix may be adapted for fixing the holder on a person or an object. For example, one or more ends of the helix may be folded over so that the holder may be fixed on a person or an object by hanging or clipping over a person's clothing waist band, purse or the like.

The holder may be made by any method. Some methods include forming, molding, thermoforming, extrusion, injection molding, and three-dimensional printing.

WORKING EXAMPLE

The embodiments depicted in FIGS. 1-5 were made from KYDEX brand sheet, "Grade T" having a thickness of 0.0060 inches and purchased from Texas Knife Maker Supply. The article to be carried in this example is a BIC brand mini-lighter.

The holder was formed by cutting a strip of the sheet material approximately three inches long, softening the strip by heating in an oven, and adapting the softened strip to conform to the shape of the mini-lighter. Alternatively, a model of the article, a mold, or a form of the article to be carried can be used instead to adapt the softened strip to conform to the shape of the article to be carried.

A kitchen oven was pre-heated to 300 degrees Fahrenheit. The strip was placed on an inverted cookie sheet in the pre-heated oven. The strip changed in appearance going from rigid to appearing soft and flexible within about a ten minute period. Care was taken to ensure that the strip did not bubble during the softening process.

The softened strip was removed from the oven and draped over the mini-lighter. The softened strip was wrapped around the mini-lighter to form the helix. Rotating the lighter to help conform the strip to the shape of the lighter was helpful.

Before the strip was completely cooled, the end of the strip was formed to align with the center of the helix. A hole was punched in that end. The other end of the helix holder was left open to form the helix opening. The strip conformed to the shape of the lighter in the shape of a helix holder was allowed to cool.

Upon cooling to room temperature, the mini-lighter was removed from the holder by compressing at least a portion of the helix in the direction of the long axis. This may be done by placing the fingers near two different turns and squeezing or compressing turns closer together. Similarly, the holder could receive the mini-lighter again by the same compression and inserting the mini-lighter through the helix opening and then releasing the compression.

A connecting ring was inserted into the hole. A clasp was inserted through the ring. The holder with the lighter was fixed to a person's belt loop. The open end of the helix pointed, downward orienting the clasp directly above the holder and lighter being held. The lighter did not fall out of the holder and yet was within easy reach of the persons hands for removal from the holder by compression of at least a portion of the helix in the direction of the long axis (using the fingers).

While the foregoing describes various embodiments of a holder, other and further embodiments, may be devised without departing from the scope of this disclosure. The claims are not intended to be limited to embodiments, versions or examples described herein but rather to enable a person having ordinary skill in the art, in combination with the information and knowledge of a person of ordinary skill in the art to make and use what is disclosed.

What is claimed is:

1. A holder comprising:
a helix in the form of a non-circular snip having a thickness, length and width, having a first end, a second end, an inner surface, an outer surface, at least two turns separated from each other by a space wherein the turns are substantially similar in arc, a long axis, an interior, an opening capable of receiving an article at least partially into the interior, wherein
at least a portion of the inner surface is capable of gripping the article when a strain is applied to at least a portion of the helix in the direction of the long axis,
at least a portion of the helix is capable of opposing the strain, and
the inner surface is further capable of reducing or releasing gripping the article when compression is applied to at least a portion of the helix in the direction of the long axis.

2. The holder of claim 1 wherein the inner surface is adapted to at least partially conform to the shape of the article.

3. The holder of claim 1 wherein each end of the helix is capable of opposing the strain.

4. The holder of claim 1 wherein the strain is exerted by the weight of the article.

5. The holder of claim 1 further comprising at least one tab on the helix.

6. The holder of claim 1 wherein the helix is comprised of an alloy of acrylic acid, or a derivative thereof, and of polyvinyl chloride.

7. A holder comprising:
   a helix in the form of a non-circular strip having a thickness, length and width, having a first end, a second end, a surface, at least two turns separated from each other by a space wherein the turns are substantially similar in arc, a long axis, an interior, an opening capable of at least partially receiving an article into the interior, a fastener capable of fixing the helix on a person or object, wherein at least a portion of the surface is capable of
   gripping the article when strain is applied to in least a portion of the helix in the direction of the long axis, and of reducing or releasing gripping the article when compression is applied to at least a portion of the helix in the direction of the long axis, and
   the strain is exerted by the weight of the article.

8. The holder of claim 7 wherein at least a portion of the surface is adapted to at least partially conform to the shape of the article.

9. The holder of claim 7 further comprising at least one tab on the helix.

10. A holder comprising:
    a helix in the hum of a non-circular strip having a thickness, length and width, having a first end, a second end, at least two turns separated from each other by a space wherein the turns are substantially similar in arc, a long axis, an interior, an opening capable of receiving an article at least partially into the interior, an outer surface and an inner surface wherein the helix is adapted to fix in opposition to as strain applied to at least a portion of the helix in the direction of the long axis, and the inner surface is capable of
    substantially conforming to at least a portion of the shape of the article,
    gripping the article when a strain is applied to at least a portion of the helix, in the long axis direction,
    reducing or releasing the gripping of the article when compression is applied to at least as portion of the helix in the direction of the long axis.

11. The holder of claim 10 further comprising at least one tab on the helix.

12. The holder of claim 10 wherein the helix is adapted to fix in opposition to the strain with a fastener selected from the group consisting of a clip, a clasp, a spiral, a ring, a pin, a safety pin, a band, a loop, a cord, a leash, a string.

13. A kit comprising:
    a helix in the form of a non-circular strip having a thickness, length and width, and an article carried by the helix, the helix comprised of a first end, a second end, a surface, at least two turns separated from each other by a space wherein the turns are substantially similar in arc, as long axis, an interior, an opening capable of receiving the article at least partially into the interior, a fastener capable of fixing the helix on a person or object in opposition to a strain applied to at least a portion of the helix in the direction of the long axis, wherein the helix is capable of
    gripping the article, and of
    reducing or releasing the gripping by compression of at least a portion of the helix in the direction of the long axis.

14. The kit of claim 13 wherein at least a portion of the surface is adapted to at least partially conform to the shape of the article.

15. The kit of claim 13 wherein the article carried is selected from the group consisting of a lighter, a case for carrying smoking accessories, a cigarette, an electronic cigarette, a cell phone, a tablet, a writing, utensil, a bottle, a can, a tube, a case, a flashlight, a pocket knife, a wallet, a hair brush and a hair dryer.

16. A method of using a holder comprising:
    at least partially inserting an article into a helix in the form of a non-circular strip having a thickness, length and width and at least two turns separated from each other by a space wherein the turns are substantially similar in arc;
    applying a strain to at least a portion of the helix in the direction of the long axis;
    gripping the article;
    reducing or releasing the gripping of the article when compression is applied to at least a portion of the helix in the direction of the long axis.

* * * * *